United States Patent
Fout et al.

(10) Patent No.: US 6,886,273 B2
(45) Date of Patent: May 3, 2005

(54) APPARATUS AND METHOD FOR SEPARATING HYDROCARBONS FROM MATERIAL

(75) Inventors: Gary E. Fout, Cypress, TX (US); Jerry T. Connaughton, Fresno, TX (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 10/720,711

(22) Filed: Nov. 24, 2003

(65) Prior Publication Data

US 2004/0064969 A1 Apr. 8, 2004

Related U.S. Application Data

(62) Division of application No. 10/051,438, filed on Oct. 25, 2001, now Pat. No. 6,658,757.

(51) Int. Cl.[7] .................................................. F26B 3/00
(52) U.S. Cl. ............................ 34/470; 34/468; 34/469; 34/480
(58) Field of Search ......................... 34/468, 469, 470, 34/480, 449, 450

(56) References Cited

U.S. PATENT DOCUMENTS

| | | | | |
|---|---|---|---|---|
| 3,991,690 A | * | 11/1976 | Bork ........................ | 110/119 |
| 4,844,807 A | * | 7/1989 | Manchak, Jr. .............. | 210/682 |
| 4,974,528 A | * | 12/1990 | Barcell ....................... | 110/240 |
| 5,215,018 A | * | 6/1993 | Sardari et al. .............. | 110/235 |
| 5,321,946 A | * | 6/1994 | Abdelmalek ................. | 60/648 |
| 5,360,067 A | * | 11/1994 | Meo, III ..................... | 166/256 |
| 5,968,370 A | * | 10/1999 | Trim ........................... | 210/723 |
| 6,146,596 A | * | 11/2000 | Hill et al. ................... | 422/117 |

* cited by examiner

*Primary Examiner*—Denise L. Esquivel
*Assistant Examiner*—Kathryn S. O'Malley
(74) *Attorney, Agent, or Firm*—Osha & May L.L.P.

(57) ABSTRACT

A system for separating hydrocarbons from a material which includes a process chamber, a process pan operatively connected to the process chamber and removable therefrom, a blower operatively connected to the process chamber and to a heat source, the blower adapted to force heated air into the process chamber through the material disposed on the process pan, the forced heated air adapted to vaporize hydrocarbons and other contaminants disposed on the material, and at least one condenser operatively connected to the process chamber and adapted to condense the vaporized hydrocarbons and other contaminants is disclosed. Further, a method for separating hydrocarbons from a material which includes passing a stream of heated air over the material to volatilize the hydrocarbons, passing the stream of heated air containing the hydrocarbons through at least one condenser to form liquid hydrocarbons, collecting the liquid hydrocarbons, and recirculating the heated air is disclosed.

6 Claims, 2 Drawing Sheets

APPARATUS AND METHOD FOR SEPARATING HYDROCARBONS FROM MATERIAL

This application is a divisional application (and claims the benefit, under 35 U.S.C. §120), of U.S. patent application Ser. No. 10/051,438, filed Oct. 25, 2001 now U.S. Pat. No. 6,658,757, which is incorporated by reference in its entirety.

BACKGROUND OF INVENTION

1. Field of the Invention

The invention relates generally to a method and apparatus for the removal of hydrocarbons from solids. More particularly, the invention relates to the low-temperature thermal desorption of petroleum hydrocarbons from contaminated soil.

2. Background Art

When drilling or completing wells in earth formations, various fluids typically are used in the well for a variety of reasons. For purposes of description of the background of the invention and of the invention itself, such fluids will be referred to as "well fluids." Common uses for well fluids include: lubrication and cooling of drill bit cutting surfaces while drilling generally or drilling-in (i.e., drilling in a targeted petroleum bearing formation), transportation of "cuttings" (pieces of formation dislodged by the cutting action of the teeth on a drill bit) to the surface, controlling formation fluid pressure to prevent blowouts, maintaining well stability, suspending solids in the well, minimizing fluid loss into and stabilizing the formation through which the well is being drilled, fracturing the formation in the vicinity of the well, displacing the fluid within the well with another fluid, cleaning the well, testing the well, implacing a packer fluid, abandoning the well or preparing the well for abandonment, and otherwise treating the well or the formation.

As stated above, one use of well fluids is the removal of rock particles ("cuttings") from the formation being drilled. A problem in disposing these cuttings, particularly when the drilling fluid is oil-based or hydrocarbon-based. That is, the oil from the drilling fluid (as well as any oil from the formation) becomes associated with or adsorbed to the surfaces of the cuttings. The cuttings are then an environmentally hazardous material, making disposal a problem.

A variety of methods have been proposed to remove adsorbed hydrocarbons from the cuttings. U.S. Pat. No. 5,968,370 discloses one such method which includes applying a treatment fluid to the contaminated cuttings. The treatment fluid includes water, a silicate, a nonionic surfactant, an anionic surfactant, a phosphate builder and a caustic compound. The treatment fluid is then contacted with, and preferably mixed thoroughly with, the contaminated cuttings for a time sufficient to remove the hydrocarbons from at least some of the solid particles. The treatment fluid causes the hydrocarbons to be desorbed and otherwise disassociated from the solid particles.

Furthermore, the hydrocarbons then form a separate homogenous layer from the treatment fluid and any aqueous component. The hydrocarbons are then separated from the treatment fluid and from the solid particles in a separation step, e.g., by skimming. The hydrocarbons are then recovered, and the treatment fluid is recycled by applying the treatment fluid to additional contaminated sludge. The solvent must be processed separately.

Some prior art systems use low-temperature thermal desorption as a means for removing hydrocarbons from extracted soils. Generally speaking, low-temperature thermal desorption (LTTD) is an ex-situ remedial technology that uses heat to physically separate hydrocarbons from excavated soils. Thermal desorbers are designed to heat soils to temperatures sufficient to cause hydrocarbons to volatilize and desorb (physically separate) from the soil. Typically, in prior art systems, some pre- and post-processing of the excavated soil is required when using LTTD. In particular, excavated soils are first screened to remove large cuttings (e.g., cuttings that are greater than 2 inches in diameter). These cuttings may be sized (i.e., crushed or shredded) and then introduced back into a feed material. After leaving the desorber, soils are cooled, re-moistened, and stabilized (as necessary) to prepare them for disposal/reuse.

U.S. Pat. No. 5,127,343 (the '343 patent) discloses one prior art apparatus for the low-temperature thermal desorption of hydrocarbons. FIG. 1 from the '343 patent reveals that the apparatus consists of three main parts: a soil treating vessel 10, a bank of heaters 12, and a vacuum and gas discharge system 14. The soil treating vessel 10 is a rectangularly shaped receptacle. The bottom wall of the soil treating vessel 10 has a plurality of vacuum chambers, and each vacuum chamber has an elongated vacuum tube positioned inside. The vacuum tube is surrounded by pea gravel, which traps dirt particles and prevents them from entering a vacuum pump attached to the vacuum tube.

The bank of heaters 12 has a plurality of downwardly directed infrared heaters, which are closely spaced to thoroughly heat the entire surface of soil when the heaters are on. The apparatus functions by heating the soil both radiantly and convectionly, and a vacuum is then pulled through tubes at a point furthest away from the heaters 12. This vacuum both draws the convection heat (formed by the excitation of the molecules from the infrared radiation) throughout the soil and reduces the vapor pressure within the treatment chamber. Lowering the vapor pressure decreases the boiling point of the hydrocarbons, causing the hydrocarbons to volatize at much lower temperatures than normal. The vacuum then removes the vapors and exhausts them through an exhaust stack, which may include a condenser or a catalytic converter. As the hydrocarbon removal process continues, however, the surface soil (i.e., those nearest the heaters) become dried out and hard, and effectively preventing the flow of air through the soil.

What is needed, therefore, is an improved LTTD process, which quickly and easily removes adsorbed hydrocarbons from cuttings.

SUMMARY OF INVENTION

In one aspect, the present invention relates to an apparatus for separating hydrocarbons from a material which comprises a process chamber, a process pan operatively connected to the process chamber and removable therefrom, a blower operatively connected to the process chamber and to a heat source. The blower is adapted to force heated air into the process chamber through the material disposed on the process pan. The forced heated air is adapted to vaporize hydrocarbons and other contaminants disposed on the material. The system includes at least one condenser operatively connected to the process chamber and adapted to condense the vaporized hydrocarbons and other contaminants.

In another aspect, the present invention relates to a method for separating hydrocarbons from a material which includes passing a stream of heated air over the material to volatilize the hydrocarbons, passing the stream of heated air containing the hydrocarbons through at least one condenser to form liquid hydrocarbons, collecting the liquid hydrocarbons, and recirculating the heated air.

In another aspect, the present invention relates to a process chamber having an inlet and an outlet, a process pan adapted to be removably inserted into the process chamber, a heat source adapted to provide heated air, the inlet and outlet of the process chamber having a sufficient pressure difference to force air heated by the heat source into the process chamber through the material disposed on the process pan, the forced heated air adapted to vaporize hydrocarbons and other contaminants disposed on the material, and a first condenser operatively connected to an outlet of the process chamber and adapted to condense the vaporized hydrocarbons and other contaminants.

Other aspects and advantages of the invention will be apparent from the following description and the appended claims.

DETAILED DESCRIPTION

Figure 1:
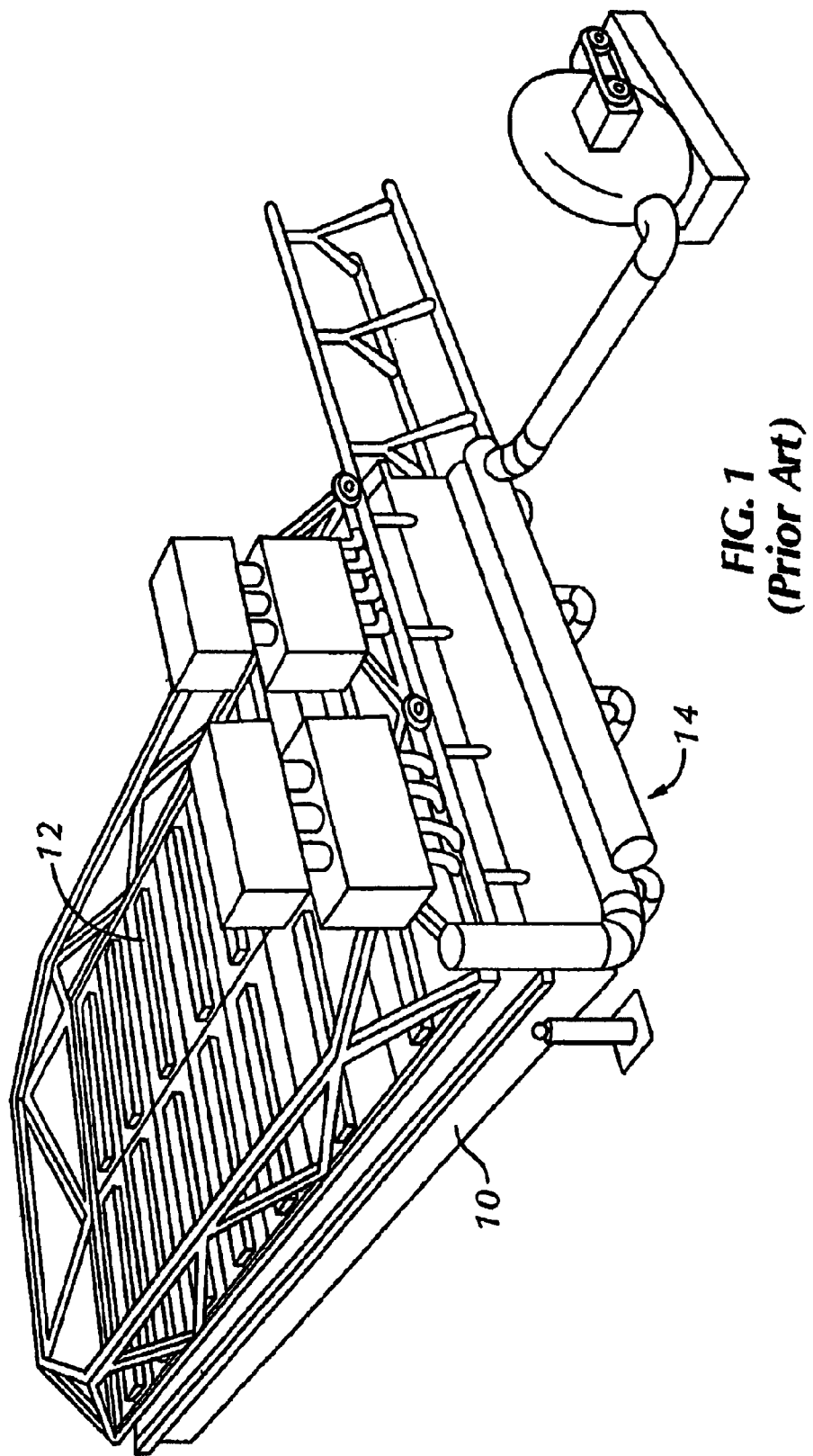
FIG. 1 is a prior art LTTD apparatus.
Figure 2:
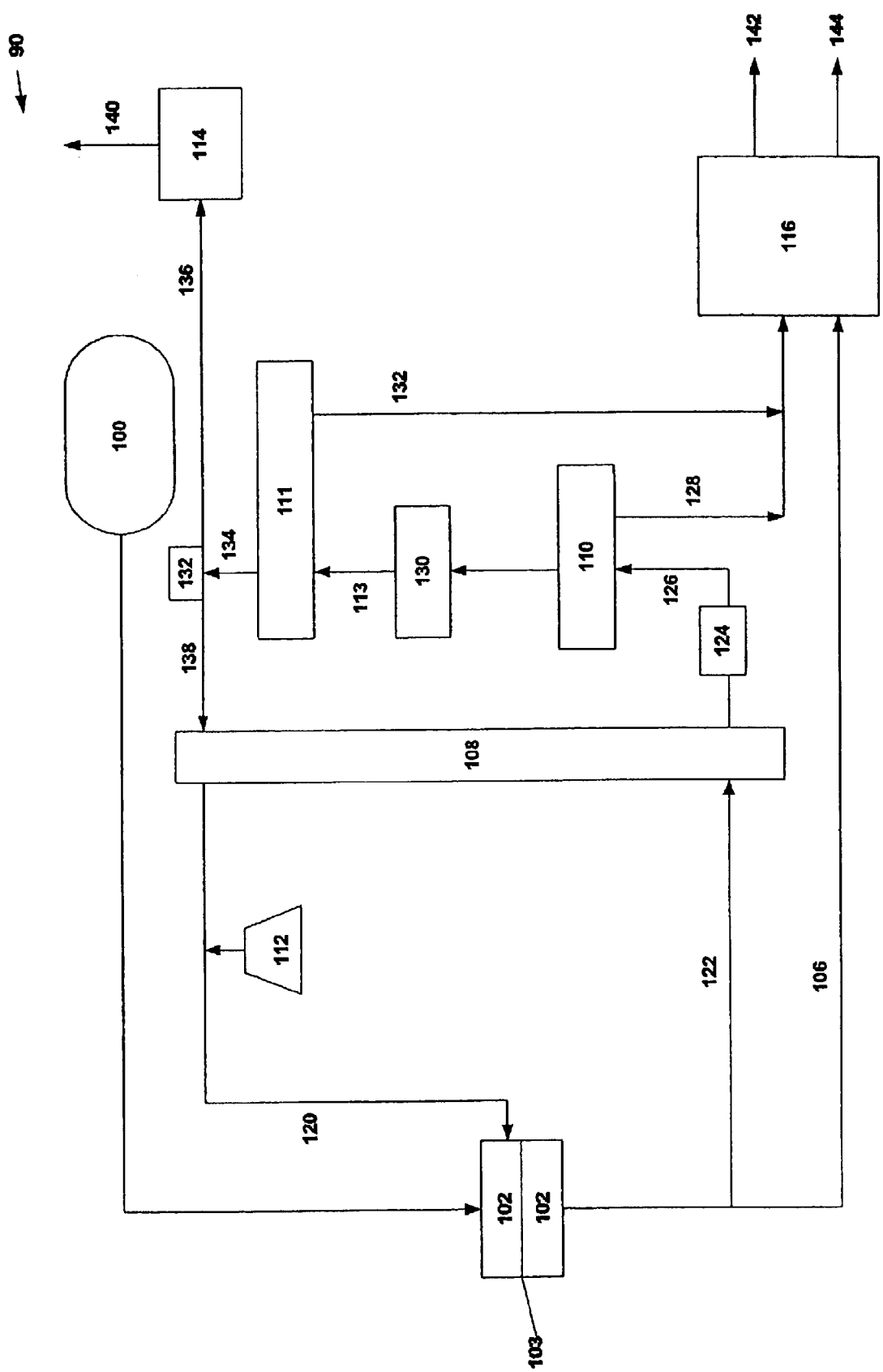
FIG. 2 is a process schematic in accordance with one embodiment of the present invention.

FIG. 2 shows an embodiment of a LTTD apparatus 90 for removing adsorbed hydrocarbons from wellbore cuttings 100. In the embodiment shown in FIG. 2, cuttings 100 contaminated with, for example, oil-based drilling fluid and/or hydrocarbons from the wellbore (not shown) are transported to the surface by a flow of drilling fluid returning from the drilled wellbore (not shown). The contaminated cuttings 100 are deposited on a process pan 102. In some embodiments, the cuttings 100 may be transported to the process pan 102 through pipes (not shown) along with the returned drilling fluid. In other embodiments, the cuttings 100 may be, for example, processed with conveying screws or belts (not shown) before being deposited in the process pan 102. The process pan 102 is then moved into a process chamber 103 via, for example, a fork lift (not shown separately in FIG. 2). For example, in some embodiments of the invention, the process pan 102 may be rolled in and out of the process chamber 103 on a series of rollers.

In other embodiments, the process pan 102 may be moved vertically in and out of the process chamber 103 with, for example, hydraulic cylinders. Accordingly, the mechanism by which the process pan 103 is moved relative to the process chamber 103 is not intended to be limiting. Moreover, some embodiments of the LTTD apparatus 90 may comprise a plurality of process chambers 103 and/or a plurality of process pans 102. Other embodiments, such as the embodiment shown in FIG. 2, comprise a single process pan 102/process chamber 103 system. Furthermore, the number of process pans 102 and process chambers 103 need not be the same.

The process chamber 103 includes, in some embodiments, a hydraulically activated hood (not shown) that is adapted to open and close over the process chamber 103 while permitting the removal or insertion of the process pan 102. After the process pan 102 has been inserted into the process chamber 103, the hydraulically activated hood (not shown) may be closed so as to "seal" the process chamber 103 and form an enclosed processing environment. The hood (not shown) may then be opened so that the process pan 102 may be removed.

After the process pan 102 has been positioned in the process chamber 103, heated air, which has been heated by a heating unit 112 (which may be, for example, a propane burner, electric heater, or similar heating device), is forced through the contaminated cuttings 100 so as to vaporize hydrocarbons and other volatile substances associated or adsorbed thereto. The heated air enters the process chamber 103 through, for example, an inlet duct 120, pipe, or similar structure known in the art. The heated air, which may be heated to, for example, approximately 400° F., is forced through the process pan 102 by, for example, a blower (not shown).

However, a blower may not be necessary in some embodiments if the pressure in the air circulation system is maintained at a selected level sufficient to provide forced circulation of the heated air through the contaminated cuttings 100. As the heated air is forced through the process pan 102, the air volatilizes the hydrocarbon and other volatile components that are associated with the cuttings 100. The hydrocarbon rich air then exits the bottom of the process chamber 103 through, for example, an outlet duct 122 and passes through a heat recovery unit 108. The heat recovery unit 108 recaptures some of the heat from the hydrocarbon rich air and, for example, uses the recaptured heat to heat additional hydrocarbon free air that may then be recirculated through the process chamber 103 through the inlet duct 120. Some hydrocarbons, water, and other contaminants from the contaminated cuttings 100 may be directly liquefied as a result of the forced-air process. These liquefied hydrocarbons, water, and/or other contaminants flow out of the process chamber 103 and through a process chamber outlet line 106.

After passing through the heat recovery unit 108, the hydrocarbon rich air is drawn through a series of filters 124 that are adapted to remove particulate matter from the air. The hydrocarbon rich air is then passed through an inlet 126 of a first condenser 110. Note that the inlet 126 of the first condenser 110 is typically operated under a vacuum to control the flow of hydrocarbon rich air. The vacuum at the inlet 126 may be produced, for example, by a vacuum pump (not shown separately in FIG. 2).

The first condenser 110 further comprises cooling coils (not shown separately in FIG. 2) adapted to condense the volatilized hydrocarbons (and, for example, an water vapor and/or other contaminants) in the hydrocarbon rich air into a liquid form. The liquefied hydrocarbons and contaminants are then removed through, for example, a condenser outlet 128 that conveys the liquefied hydrocarbons and contaminants to an oil/water separator 116. The LTTD system 90 may also comprise, for example, pumps (not shown) that may assist the flow of liquefied hydrocarbons and contaminants from the condenser outlet 128 to the oil/water separator 116.

After passing through the first condenser 110, the cooled air then flows through a second series of filters and cooling coils 130 and into a second condenser 111 that operates at or near atmospheric pressure. The second condenser 111 boosts the pressure of the ambient airflow, and any additional condensate is removed from the process stream through an outlet 132 that transports the additional condensate to the oil/water separator 116.

Airflow is maintained in the system by the operation of a main blower 113 which draws air from the first condenser 110 and blows it into the second condenser 111. However, other embodiments of the LTTD system 90 may comprise additional blowers and pumps as required to maintain a flow of air and condensed hydrocarbons in the system 90. After being discharged from the second condenser 111, the cooled, substantially hydrocarbon free air may pass through one of two routes as determined by, for example, a control valve 132 connected to second condenser outlet 134, a thermal oxidizer inlet 136, and a heat recovery unit inlet 138. Air enters the system from the heaters 112 and eventually pressures the system. The control valve 132 releases excess pressure through a thermal oxidizer 114 to incinerate the non-condensable gases. The thermally oxidized air may then be vented to the atmosphere through a thermal oxidizer outlet 140.

Alternatively, the air may be routed back through the heat recovery unit 108 through the heat recovery unit inlet 138. The air is then pre-heated by the burner 112 so that it may be forced through the process chamber 103 and thereby repeat the processing cycle. Thus, the air is "recycled" by controlling the flow of air from the blower 113 with the control valve 132.

The control valve 132 may comprise, for example, a flow meter, a pressure transducer, or any similar device known in the art that is adapted to maintain a selected mass flow rate through the LTTD system 90. The control valve 132 may be operatively coupled to, for example, a processor (not shown) that is adapted to maintain the selected mass flow rate of the air through the system 90 by controlling the flow of air through the thermal oxidizer inlet 136 and through the heat recovery unit inlet 138.

Alternatively, the control valve 132 may comprise a pressure relief valve that is adapted to relieve excess pressure in the system (wherein, for example, the excess pressure corresponds to an excess mass flow rate of air through the system 90) through the thermal oxidizer inlet 136 so that excess air flow may be vented through the thermal oxidizer 114. In another embodiment, the control valve 132 may comprises a sensor to determine whether non-condensable gases are present. The sensor alarms when non condensable gasses reach a high set point. This is used to prevent accidental combustion. This air is control released through the thermal oxidizer. In this manner, all of the gas containing non-condensable components are removed from the process.

The oil/water separator 116 is adapted to process and separate the condensate formed in the process chamber 103 (through the process chamber outlet line 106) and in the first condenser 110 (through the condenser outlet 128) into hydrocarbon 142 and water 144 components. The oil/water separator 116 receives the liquefied hydrocarbons and other contaminants and recovers both hydrocarbon components 142 and water components 144 through a separation process that is known in the art.

The effectiveness of the above described embodiment was then tested on four materials. The four materials were sand (mean particle size less than 1 mm), gravel (mean particle size 10 to 30 mm having as much as 5% hydrocarbon content), oil based cuttings (mean particle size from 1 to 20 mm, having as much as 11% hydrocarbon content), and soil (mixture of sand, clay and water having as much as 5% hydrocarbon). Samples of various particle size were then placed in the apparatus and hydrocarbon removal was determined.

In a first test of the embodiment of FIG. 2, gravel particles having a mean particle size of approximately 20 mm to 30 mm were loaded into the process pan 102, forming a two inch thick layer of gravel particles. The process pan 102 was then loaded into the process chamber 103. The gravel particles had an initial hydrocarbon content of 1.2% by weight. In this embodiment, diesel fuel was used as the hydrocarbon. Hydrocarbon content was measured using the API-RP13B-2 Sect.6 retort method. The gravel particles were then treated for 2 hours. After two hours had elapsed, the apparatus was shut down, and the gravel particles were allowed to cool to room temperature. A final hydrocarbon content reading was then taken. After the above treatment, the gravel particles were found to have 0% hydrocarbon remaining.

In a second test of the embodiment of FIG. 2, gravel particles having a mean particle size of approximately 20 mm to 30 mm were loaded into the process pan 102, forming a seven inch thick layer of gravel particles. The process pan 102 was then loaded into the process chamber 103. The gravel particles had an initial hydrocarbon content of 1.8% by weight. In this embodiment, diesel fuel was used as the hydrocarbon. Hydrocarbon content was measured using the API-RP13B-2 Sect.6 retort method. The gravel particles were then treated for 2 hours. After two hours had elapsed, the apparatus was shut down, and the gravel particles were allowed to cool to room temperature. A final hydrocarbon content reading was then taken. After the above treatment, the gravel particles were found to have 0% hydrocarbon remaining.

In a third test of the embodiment of FIG. 2, gravel particles having a mean particle size of approximately 20 mm to 30 mm were loaded into the process pan 102, forming a twelve inch thick layer of gravel particles. The process pan 102 was then loaded into the process chamber 103. The gravel particles had an initial hydrocarbon content of 2.1% by weight. In this embodiment, diesel fuel was used as the hydrocarbon. Hydrocarbon content was measured using the API-RP 13B-2 Sect.6 retort method. The gravel particles were then treated for 2 hours. After two hours had elapsed, the apparatus was shut down, and the gravel particles were allowed to cool to room temperature. A final hydrocarbon content reading was then taken. After the above treatment, the gravel particles were found to have 0% hydrocarbon remaining.

In a fourth test of the embodiment of FIG. 2, sand/clay/water balls having a diameter of approximately 6 mm to 31 mm were loaded into the process pan 102, forming a six inch thick layer. In this embodiment, the sand/clay/water ("soil") particles were mixed to form spherical particles ("balls") in order to increase the porosity of the particles. The process pan 102 was then loaded into the process chamber 103. The sand/clay/water balls had an initial hydrocarbon content of 1.9% by weight. In this embodiment, diesel fuel was used as the hydrocarbon. Hydrocarbon content was measured using the API-RP13B-2 Sect.6 retort method. The sand/clay/water balls were then treated for 2 hours. After two hours had elapsed, the apparatus was shut down, and the sand/clay/water balls were allowed to cool to room temperature. A final hydrocarbon content reading was then taken. After the above treatment, the sand/clay/water balls were found to have 0.1% hydrocarbon remaining.

In a fifth test of the embodiment of FIG. 2, sand/clay/water balls having a diameter of approximately 6 mm to 31 mm were loaded into the process pan 102, forming a twelve inch thick layer. In this embodiment, the sand/clay/water ("soil") particles were mixed to form spherical particles ("balls") in order to increase the porosity of the particles. The process pan 102 was then loaded into the process chamber 103. The sand/clay/water balls had an initial hydrocarbon content of 4.6% by weight. In this embodiment, diesel fuel was used as the hydrocarbon. Hydrocarbon content was measured using the API-RP13B-2 Sect.6 retort method. The sand/clay/water balls were then treated for 2 hours. After two hours had elapsed, the apparatus was shut down, and the sand/clay/water balls were allowed to cool to room temperature. A final hydrocarbon content reading was then taken. After the above treatment, the sand/clay/water balls were found to have 0.1% hydrocarbon remaining.

In a sixth test of the embodiment of FIG. 2, sand/clay/water balls having a diameter of approximately 6 mm to 31 mm were loaded into the process pan 102, forming a twelve inch thick layer. In this embodiment, the sand/clay/water ("soil") particles were mixed to form spherical particles ("balls") in order to increase the porosity of the particles. The process pan 102 was then loaded into the process chamber 103. The sand/clay/water balls had an initial hydrocarbon content of 7.0% by weight. In this embodiment, diesel fuel was used as the hydrocarbon. Hydrocarbon content was measured using the API-RP13B-2 Sect.6 retort method. The sand/clay/water balls were then treated for 2 hours. After two hours had elapsed, the apparatus was shut down, and the sand/clay/water balls were allowed to cool to room temperature. A final hydrocarbon content reading was then taken. After the above treatment, the sand/clay/water balls were found to have 0.1% hydrocarbon remaining.

The results are tabulated below.

TABLE 1

LTTD RESULTS

| Test | Description | Initial Hydrocarbon % wt | Finished Hydrocarbon % wt |
|---|---|---|---|
| 1 | Gravel particle size 20–30 mm 2 inch bed with of diesel added | 1.2 | 0 |
| 2 | Gravel particle size 20–30 mm 7 inch bed with diesel added | 1.8 | 0 |
| 3 | Gravel particle size 20–30 mm 12 inch bed with diesel added | 2.1 | 0 |
| 4 | Sand/clay/water/oil balls 6 to 31 mm, 6 inch bed thickness | 1.9 | 0.1 |
| 5 | Sand/clay/water/oil balls 6 to 31 mm, 12 inch bed thickness | 4.6 | 0.1 |
| 6 | Sand/clay/water/oil balls 6 to 31 mm, 12 inch bed thickness. Test conducted for Client. | 7.0 | 0.1 |

The above table illustrates that hydrocarbons may be removed from a variety of substances and at varying weight percentages. While the present invention is described with reference to particular soil samples, no limitation is intended by such description. It is expressly within the scope of the present invention that hydrocarbons may be removed from drilling mud, other types of cuttings, and other solids associated with the production of hydrocarbons. Further, it is expressly within the scope of the present invention that varying numbers of process pans, process chambers, burners, condensers, thermal oxidizers, and heat recovery units may be used. No limitation is intended on the scope of the invention by reference to any of these elements in the singular or plural as described above.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for separating hydrocarbons from a material, comprising:

using a blower to force a stream of heated air into an inlet of a process chamber;

passing the stream of heated air through the material to volatilize hydrocarbons disposed thereon;

passing the stream of heated air containing the hydrocarbons through a first condenser to form liquefied hydrocarbons;

collecting the liquefied hydrocarbons; and recirculating the heated air.

2. The method of claim 1, further comprising filtering the stream of air prior to passing the stream through a condenser.

3. The method of claim 1, further comprising filtering the stream of air after passing the stream through a condenser.

4. The method of claim 1, further comprising passing the stream of air through a second condenser.

5. The method of claim 1, further comprising thermally oxidizing any non-condensable gases prior to re-circulating the stream of air.

6. The method of claim 1, wherein a hydrocarbon content of a material is reduced to 0.1% or less after treating the material for a period of time.

* * * * *